United States Patent
Khazaka

(10) Patent No.: US 6,445,934 B1
(45) Date of Patent: Sep. 3, 2002

(54) METHOD AND APPARATUS FOR ENTERING ALPHANUMERIC CHARACTERS WITH ACCENTS OR EXTENSIONS INTO AN ELECTRONIC DEVICE

(75) Inventor: Samir K. Khazaka, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/233,503

(22) Filed: Jan. 19, 1999

(51) Int. Cl.⁷ .................................................. H04M 1/00
(52) U.S. Cl. ...................... 455/566; 455/466; 345/169
(58) Field of Search ............................... 455/550, 561, 455/566, 575, 90, 466; 345/168, 169, 171, 25, 26

(56) References Cited

U.S. PATENT DOCUMENTS

| | | | | |
|---|---|---|---|---|
| 4,740,783 A | * | 4/1988 | Lawrence | 340/720 |
| 5,128,672 A | * | 7/1992 | Kaehler | 341/23 |
| 5,623,682 A | | 4/1997 | Fukunaga | 395/798 |
| 6,043,760 A | * | 3/2000 | Laakkonen | 341/22 |
| 6,046,732 A | * | 4/2000 | Nishimoto | 345/168 |
| 6,054,941 A | * | 4/2000 | Chen | 341/28 |
| 6,104,317 A | * | 8/2000 | Panagrossi | 341/20 |
| 6,130,628 A | * | 10/2000 | Schneider-Hufschmidt | 341/26 |

FOREIGN PATENT DOCUMENTS

| | | | |
|---|---|---|---|
| EP | 0397164 | 11/1990 | B41J/5/08 |
| EP | 0816988 | 1/1998 | G06F/3/023 |
| WO | 9705541 | 2/1997 | G06F/3/023 |

* cited by examiner

Primary Examiner—Daniel Hunter
Assistant Examiner—Nick Corsaro

(57) ABSTRACT

A method and apparatus for entering an alphanumeric character with an accent or extension into an electronic device. A base character is entered into the device using a keypad, and the base character is then displayed on the device display. Next, a table that includes a plurality of accents or extensions is displayed for the user on the device display. The user then selects an accent or extension from the table that the user wishes to associate with the base character. After the selection of the accent or extension from the table by the user, the base character is replaced on the device display with a composite character that consists of the base character and the accent or extension selected by the user from the table.

11 Claims, 2 Drawing Sheets

METHOD AND APPARATUS FOR ENTERING ALPHANUMERIC CHARACTERS WITH ACCENTS OR EXTENSIONS INTO AN ELECTRONIC DEVICE

BACKGROUND OF THE INVENTION

1. Field of the Invention

The present invention relates generally to systems for entering alphanumeric characters into electronic devices. More particularly, the present invention relates to systems for entering characters having accents or extensions into electronic devices.

2. Description of the Related Art

Multiple keystroke keypads are known in the art. In such keypads, each alphanumeric key is associated with one number and several text characters. For example, the second key on the keypad is typically associated with the number "2" and the text characters "A", "B", and "C". In order to enter text characters into an electronic device using such a key, the user will depress the key once to enter an "A", the user will depress the key twice to enter a "B", and the user will depress the key three times to enter a "C".

Languages other than English, such as French and Spanish, use accents on text characters. In order to accommodate the use of such accents, known multiple keystroke keypads associate more than three text characters with a single key. For example, the characters "À", "Á", "A", "B" and "C" may be associated with a single key. Due to the increased number of characters associated with the key, a user is required to depress the key as many as four or five times to select a particular character associated with the key. Requiring a user to depress a single key as many as five times to select a particular character is undesirable, as such a high number of keystrokes can be annoying to the user or difficult for the user to accurately perform.

It would therefore be desirable if there was a system which allowed a user to enter characters with accents or extensions into a device using a multiple keystroke keypad, and which minimized the number of keystrokes required by the user to enter the information.

SUMMARY OF THE INVENTION

The present invention is direct to a method and apparatus for entering an alphanumeric character with an accent or extension into an electronic device. A base character is entered into the device using a keypad, and the base character is then displayed on the device display. Next, a table that includes a plurality of accents or extensions is displayed for the user on the device display. The user then selects an accent or extension from the table that the user wishes to associate with the base character. After the selection of the accent or extension from the table by the user, the base character is replaced on the device display with a composite character that consists of the base character and the accent or extension selected by the user from the table.

In a particularly preferred embodiment, the accents or extensions in the table displayed for the user are ordered in response to the base character entered by the user and/or in response to a language selection entered by the user. In this embodiment, the accents or extensions that are most likely to be selected by the user are determined based on the language and the base character entered by the user, and the most likely extensions or accents are then placed at the top of the table displayed for the user. This aspect of the invention facilitates the rapid selection of the desired accent or extension from the table by the user.

BRIEF DESCRIPTION OF THE DRAWINGS

The features, objects and advantages of the present invention will become more apparent from the detailed description set forth below when taken in conjunction with the drawings in which like reference characters identify corresponding elements and wherein.

DETAILED DESCRIPTION OF THE PREFERRED EMBODIMENTS

Figure 1:
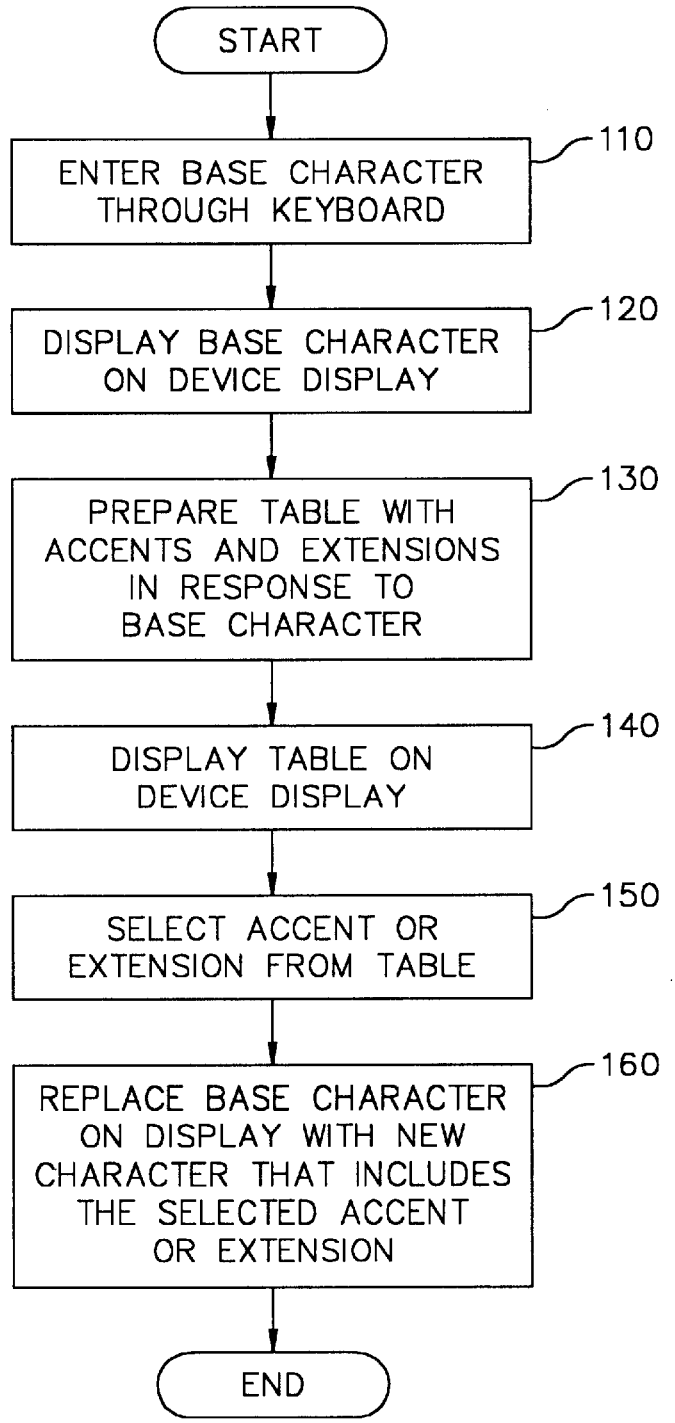
FIG. 1 is a flow diagram of a method for entering an alphanumeric character having an accent or extension into an electronic device, in accordance with a preferred embodiment of the present invention.
Figure 2:
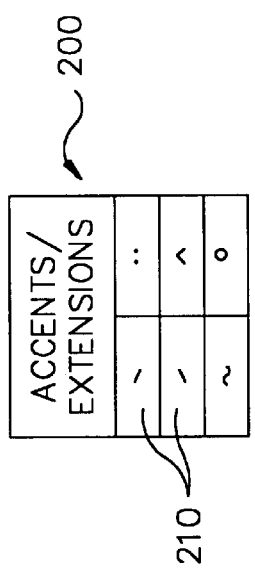
FIG. 2 shows an exemplary table for displaying accents or extensions that may be combined with a base character, in accordance with the present invention.

Referring now to FIG. 1, there is shown a flow diagram of a method 100 for entering an alphanumeric character having an accent or extension into an electronic device such as a mobile or portable telephone, in accordance with a preferred embodiment of the present invention. In step 110, a user enters a base character (i.e., a text character with no accent or extension) into the device using a multiple keystroke keypad. In step 120, the base character entered in step 110 is displayed for the user on the device display. Next, in steps 130 and 140, a table (such as table 200 in FIG. 2) containing accents or extensions 210 that could be associated with the base character is prepared and displayed for the user. The accents or extensions 210 in table 200 are ordered in response to the base character entered by the user. More particularly, the accents or extensions that may possibly be associated with the base character are determined based on the base character entered by the user, and the most likely extensions or accents 210 to be selected by the user are placed at the top of the table 200. This aspect of the invention facilitates the rapid selection of the desired accent or extension 210 from the table by the user. In step 150, the user selects one of the accents or extensions 210 to associate with the base character by, for example, using a scroll button on the keypad or device to scroll through and then select one of the displayed accents/extensions 210. After the selection of the desired accent or extension 210 from the table 200 by the user, the base character is replaced on the device display in step 160 with a composite character that consists of the base character and the accent or extension selected by the user from the table. Thus, for example, if the base character selected by the user in step 110 corresponded to an "A", and the accent selected in step 150 corresponded to a "´", then in step 160 the base character "A" would be replaced with the composite character "Á".

Figure 3:
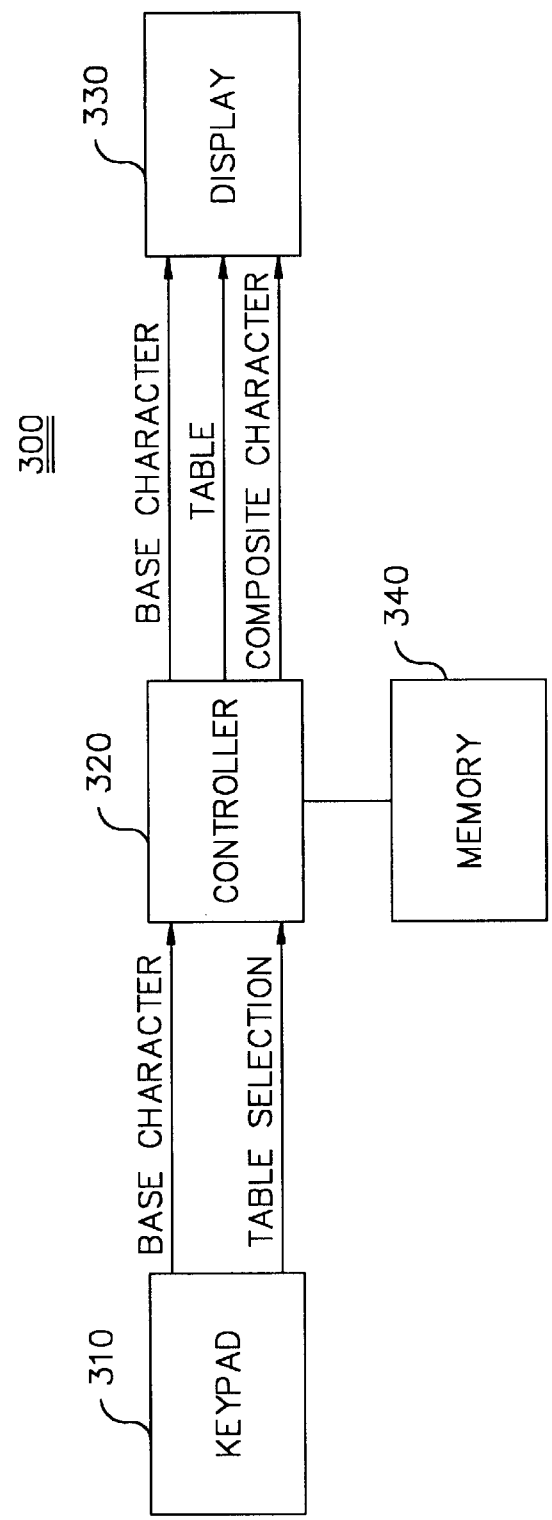
FIG. 3 is a block diagram of a system for entering an alphanumeric character having an accent or extension into an electronic device, in accordance with a preferred embodiment of the present invention.

Referring now to FIG. 3, there is shown a block diagram of a system 300 for implementing the method shown in FIG. 1. The system 300 includes a multiple keystroke keypad 310 that transmits a signal representative of a base character selected by the user to a controller 320. A device display 330 is coupled to the controller 320, and functions to display the base character to the user.

The controller 320 is coupled to a memory 340, which preferably stores a separate ordered list of accents or extensions for each base character that might be entered by the user. Each of the ordered lists stored in the memory 340 preferably corresponds to the accents or extensions that may be selected by the user for a given base character, with the most likely extensions or accents to be selected by the user being placed at the top of the list. In response to the base character selection, the controller 320 retrieves the accent/extension list associated with the base character from the memory 340, and the controller 320 sends a signal representative of the accent/extension list to the device display 330 which displays the list in the form of a table such as table 200.

After the table of accents/extensions is displayed for the user, the user selects an accent/extension to associate with the base character from the table using the keypad 310, which transmits a signal representative of the selected accent/extension to the controller 320. In response to this signal, the controller 320 sends a signal to the device display 330 that replaces the base character on the device display 330 with a composite character that consists of the base character and the accent or extension selected from the table by the user.

The previous description of the preferred embodiments is provided to enable any person skilled in the art to make or use the present invention. Various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method for entering a composite character including an alphanumeric character and an accent or extension into an electronic communication device, comprising the steps of:

(A) entering a base character into the device using a keypad and displaying the base character on a device display;

(B) automatically displaying, on the device display, a table that includes a plurality of accents or extensions that are associated with the base character entered into the device;

(C) wherein the accents or extensions in the table appear in a prioritized order based on a probability of being selected selecting an accent or extension from the table; and (D) replacing, on the device display, the base character with a composite character that consists of the base character and the accent or extension selected in step (C).

2. The method of claim 1, wherein the accents or extensions in the table displayed in step (B) are ordered in response to the base character entered in step (A).

3. The method of claim 2, wherein the accents or extensions that are most likely to be selected in step (C) appear at the top of the table displayed in step (B).

4. The method of claim 1, wherein the keypad used in step (A) is a multiple keystroke keypad.

5. The method of claim 1, wherein the electronic device is a mobile telephone.

6. An apparatus for entering a composite character including an alphanumeric character and an accent or extension into an electronic communication device, comprising:

(A) a keypad that transmits a signal representative of a base character selected by a user to a controller; and (B) a device display, coupled to the controller, that displays the base character to the user, wherein the device display automatically displays a table that includes a plurality of accents or extensions that are associated with the selected base character to the user after the base character has been selected by the user, the accents or extensions in the table appear in a prioritize order based on a probability of being selected and the keypad transmits a signal representative of one of the accents or extensions from the table to the controller in response to a selection of the one of the accents or extensions from the table by the user;

wherein, in response to the signal representative of one of the accents or extensions from the table, the controller sends a signal to the device display that replaces the base character on the device display with a composite character that consists of the base character and the accent or extension selected from the table by the user.

7. The apparatus of claim 6, wherein the accents or extensions in the table displayed on the device display are ordered in response to the base character selected by the user.

8. The apparatus of claim 7, wherein the accents or extensions that are most likely to be selected by the user appear at the top of the table displayed on the device display.

9. The apparatus of claim 6, wherein the keypad is a multiple keystroke keypad.

10. The apparatus of claim 6, wherein the electronic device is a mobile telephone.

11. The apparatus of claim 6, wherein the accents or extensions in the table displayed on the device display are selected and displayed in response to a selected language.

\* \* \* \* \*